United States Patent
Dailey

(10) Patent No.: US 10,282,190 B2
(45) Date of Patent: May 7, 2019

(54) SYSTEM AND METHOD FOR UPDATING A UEFI IMAGE IN AN INFORMATION HANDLING SYSTEM

(71) Applicant: DELL PRODUCTS, L.P., Round Rock, TX (US)

(72) Inventor: James E. Dailey, Round Rock, TX (US)

(73) Assignee: Dell Products, L.P., Round Rock, TX (US)

( * ) Notice: Subject to any disclaimer, the term of this patent is extended or adjusted under 35 U.S.C. 154(b) by 0 days.

(21) Appl. No.: 15/366,180

(22) Filed: Dec. 1, 2016

(65) Prior Publication Data
US 2018/0157475 A1    Jun. 7, 2018

(51) Int. Cl.
G06F 9/445 (2018.01)
G06F 8/65 (2018.01)
G06F 9/4401 (2018.01)
G06F 8/654 (2018.01)

(52) U.S. Cl.
CPC ............... G06F 8/65 (2013.01); G06F 8/654 (2018.02); G06F 9/4401 (2013.01)

(58) Field of Classification Search
CPC ........................................................ G06F 8/65
See application file for complete search history.

(56) References Cited

U.S. PATENT DOCUMENTS

| | | | | |
|---|---|---|---|---|
| 7,367,027 | B1 * | 4/2008 | Chen | H04L 12/66 717/168 |
| 9,135,435 | B2 * | 9/2015 | Venkat | G06F 21/52 |
| 9,483,635 | B2 * | 11/2016 | Azab | G06F 21/53 |
| 9,563,439 | B2 * | 2/2017 | Khatri | G06F 9/4403 |
| 9,620,184 | B1 * | 4/2017 | Bialas, Jr. | G11C 29/021 |
| 9,627,030 | B1 * | 4/2017 | Bialas, Jr. | G11C 11/401 |
| 2007/0028226 | A1 * | 2/2007 | Chen | G06F 8/658 717/168 |
| 2010/0077199 | A1 * | 3/2010 | Hobson | G06F 21/572 713/100 |
| 2010/0313191 | A1 * | 12/2010 | Yin | G06F 8/65 717/168 |
| 2010/0325622 | A1 * | 12/2010 | Morton | G06F 8/654 717/168 |
| 2012/0303630 | A1 * | 11/2012 | Gelfand | G06F 17/30091 707/741 |
| 2014/0007067 | A1 * | 1/2014 | Nelson | G06F 8/665 717/168 |
| 2014/0007069 | A1 * | 1/2014 | Cavalaris | G06F 8/654 717/170 |

(Continued)

Primary Examiner — Matthew J Brophy
(74) Attorney, Agent, or Firm — Isidore PLLC

(57) ABSTRACT

A method, information handling system (IHS) and a computer program product for updating a unified extensible firmware interface (UEFI) image in an IHS. The method includes retrieving a new UEFI image and a current UEFI image. First data type regions contained within the new UEFI image and second data type regions contained within the current UEFI image are identified. If a first data type region name from the new UEFI image matches a second data type region name from the current UEFI image and a first size of the first data type region is larger than or equal to a second size of the second data type region, data associated with the first data type region is copied to a modified new UEFI image.

18 Claims, 5 Drawing Sheets

(56) References Cited

U.S. PATENT DOCUMENTS

| | | | | |
|---|---|---|---|---|
| 2014/0007073 A1* | 1/2014 | Cavalaris | | G06F 8/654 |
| | | | | 717/172 |
| 2014/0229717 A1* | 8/2014 | Venkat | | G06F 21/79 |
| | | | | 712/225 |
| 2015/0199507 A1* | 7/2015 | Azab | | G06F 21/53 |
| | | | | 726/22 |
| 2015/0281237 A1* | 10/2015 | Swanson | | H04L 63/10 |
| | | | | 726/3 |
| 2015/0347151 A1* | 12/2015 | Takefman | | G06F 9/4406 |
| | | | | 713/2 |
| 2016/0027516 A1* | 1/2016 | Beroset | | G06F 8/654 |
| | | | | 711/103 |
| 2016/0048389 A1* | 2/2016 | Paulraj | | G06F 8/654 |
| | | | | 717/170 |
| 2016/0132322 A1* | 5/2016 | Jones | | G06F 9/445 |
| | | | | 717/168 |
| 2016/0202964 A1* | 7/2016 | Butcher | | G06F 8/65 |
| | | | | 717/172 |
| 2016/0321003 A1* | 11/2016 | Durand | | G06F 8/65 |
| 2016/0328240 A1* | 11/2016 | Grandin | | G06F 9/4401 |
| 2017/0046151 A1* | 2/2017 | Hsu | | G06F 9/44505 |
| 2017/0109531 A1* | 4/2017 | Wang | | G06F 21/572 |
| 2017/0286093 A1* | 10/2017 | Steshenko | | G06F 8/71 |
| 2017/0337064 A1* | 11/2017 | Vidyadhara | | G06F 9/4401 |
| 2017/0364707 A1* | 12/2017 | Lal | | G06F 13/20 |

* cited by examiner

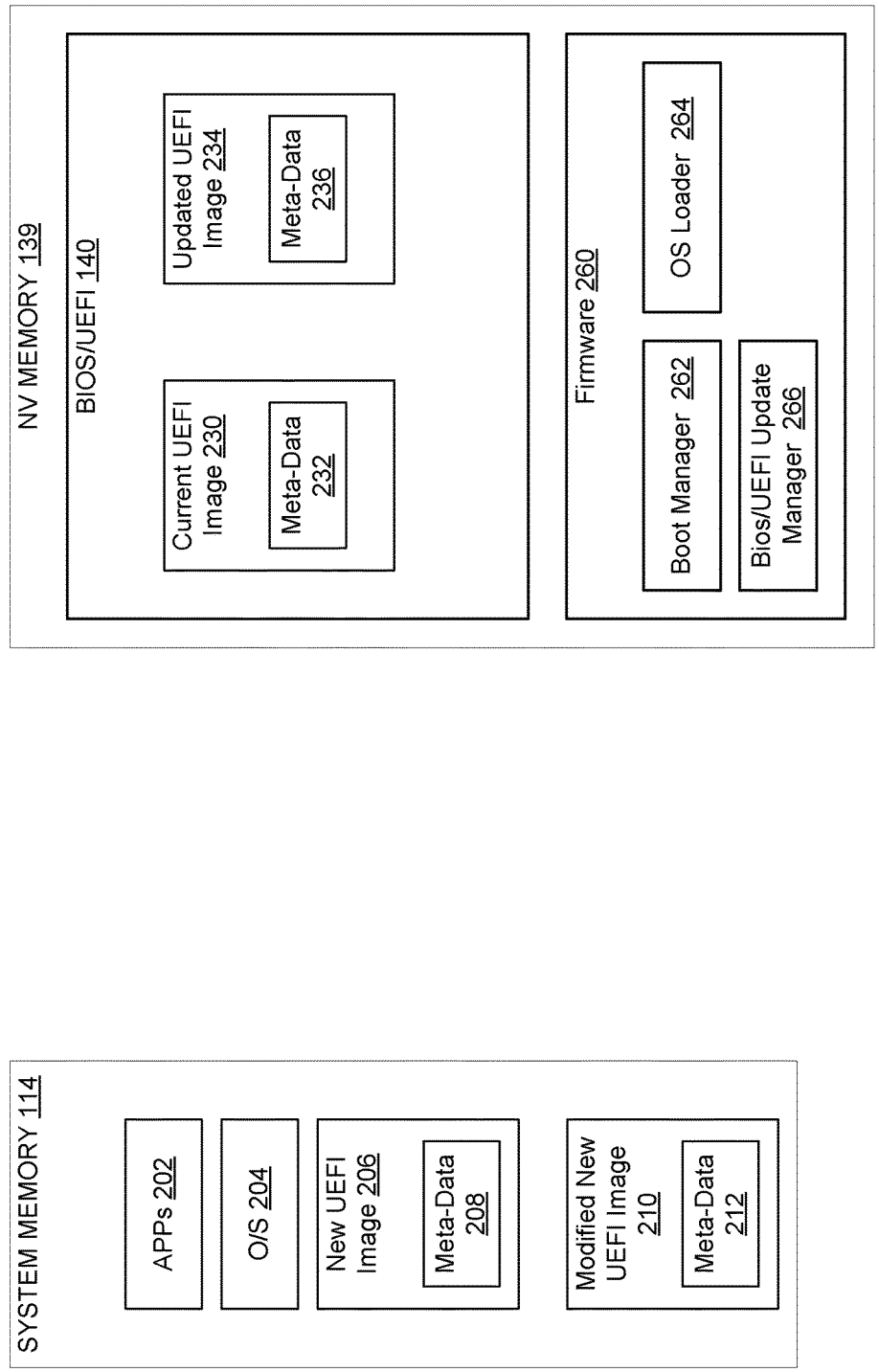

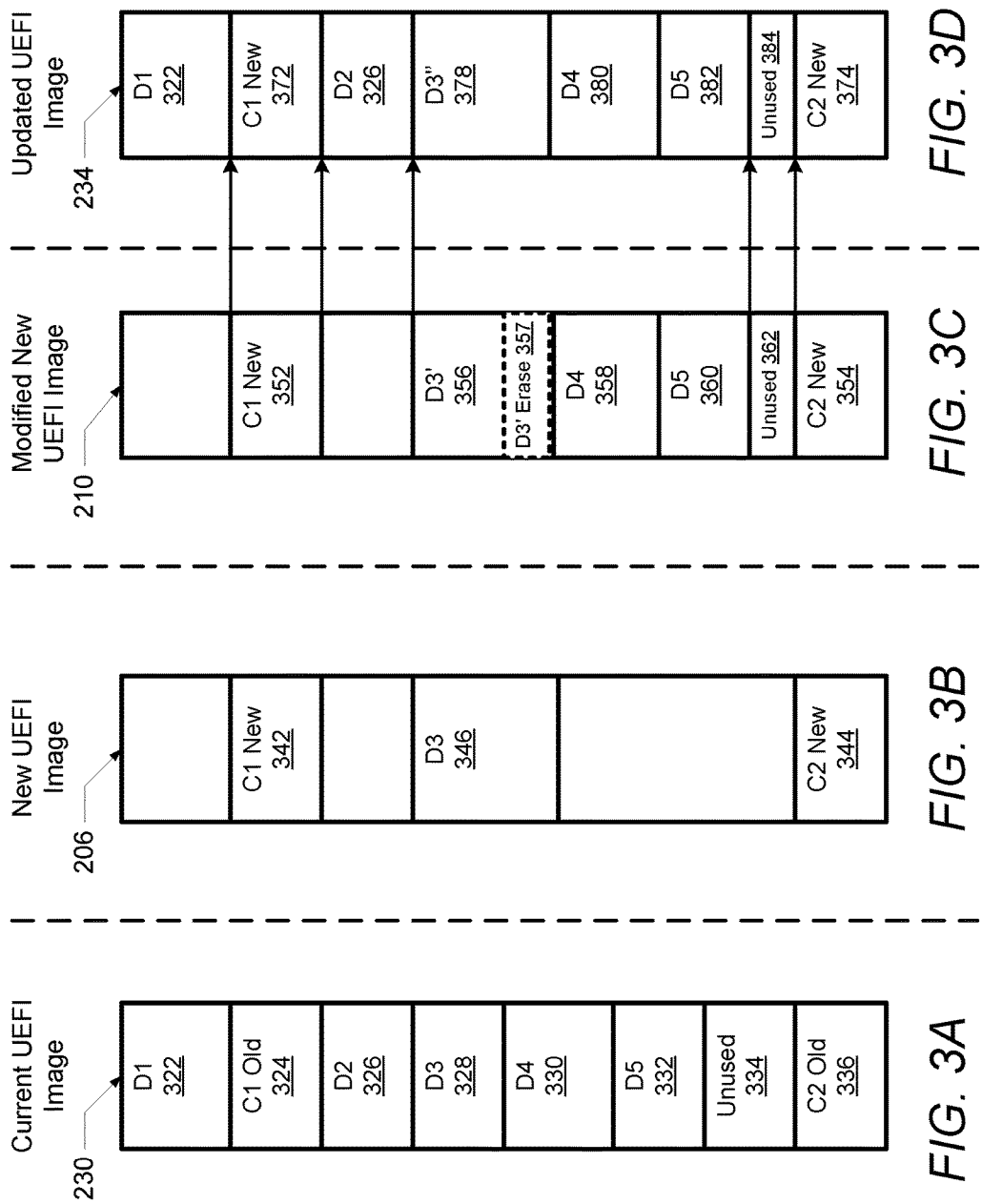

SYSTEM AND METHOD FOR UPDATING A UEFI IMAGE IN AN INFORMATION HANDLING SYSTEM

BACKGROUND

1. Technical Field

The present disclosure generally relates to information handling systems and in particular to a system and method for updating a unified extensible firmware interface (UEFI) image in an information handling system.

2. Description of the Related Art

As the value and use of information continue to increase, individuals and businesses seek additional ways to process and store information. One option available to users is information handling systems. An information handling system generally processes, compiles, stores, and/or communicates information or data for business, personal, or other purposes, thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications.

Unified extensible firmware interface (UEFI) is a specification that defines a software interface between an operating system and platform firmware. UEFI replaces the basic input/output system (BIOS) found on older information handling systems. UEFI provides a standard architecture and data structure to manage initialization and configuration of devices, booting of platform resources, and passing of control to the operating system. The UEFI specification allows for the extension of platform firmware by loading UEFI driver and application images.

The UEFI image is stored on non-volatile storage such as flash memory. The UEFI image can contain both code regions and data regions. The UEFI image can contain data regions that store variables in the non-volatile storage. Unfortunately, if the UEFI image is updated with a new image that contains code or data regions that are larger than in the original UEFI image, overwriting of areas in the flash memory that store data and variables can occur. This results in the existing data and variables being erased or lost.

BRIEF SUMMARY

Disclosed are a method, an information handling system (IHS), and a computer program product for updating a unified extensible firmware interface (UEFI) image in an IHS.

According to one embodiment, the computer-implemented method includes retrieving, via a processor, a new UEFI image from a system memory device and retrieving a current UEFI image from a non-volatile storage device. A plurality of first data type regions contained within the new UEFI image are identified and a plurality of second data type regions contained within the current UEFI image are identified. The method further includes determining if a first data type region name from the new UEFI image matches a second data type region name from the current UEFI image. The method includes, in response to determining that the first data type region name from the new UEFI image matches the second data type region name from the current UEFI image, determining if a first size of the first data type region is larger than or equal to a second size of the second data type region. In response to determining that the first size is larger than or equal to the second size, data associated with the first data type region is copied to a modified new UEFI image. The first data type region size is increased in the modified new UEFI image sufficient to store the data associated with the first data type region name.

According to another embodiment, the IHS includes a system memory device storing a new unified extensible firmware interface (UEFI) image and a non-volatile storage device having a current UEFI image stored thereon. A processor is communicatively coupled to the system memory device and the non-volatile storage device. The processor has firmware executing thereon to enable updating of the current UEFI image. The firmware configures the processor to retrieve a new UEFI image from the system memory device and retrieve a current UEFI image from the non-volatile storage device. A plurality of first data type regions contained within the new UEFI image are identified and a plurality of second data type regions contained within the current UEFI image are identified. The firmware further configures the processor to determine if a first data type region name from the new UEFI image matches a second data type region name from the current UEFI image. In response to determining that the first data type region name from the new UEFI image matches the second data type region name from the current UEFI image, the processor determines if a first size of the first data type region is larger than or equal to a second size of the second data type region. In response to determining that the first size is larger than or equal to the second size, the processor copies data associated with the first data type region to a modified new UEFI image. The first data type region size is increased in the modified new UEFI image sufficient to store the data associated with the first data type region.

In an additional embodiment, a computer program product includes a computer readable storage device and program code stored on the computer readable storage device that, when executed by a processor, configures the processor to perform the above series of method and/or processes.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which:

FIG. 2A illustrates example contents of a system memory in an IHS, in accordance with one embodiment;

FIG. 2B illustrates example contents of a non-volatile storage device, in accordance with one embodiment;

FIG. 3A illustrates example contents of a current UEFI image, in accordance with one embodiment;

FIG. 3B illustrates example contents of a new UEFI image, in accordance with one embodiment;

FIG. 3C illustrates example contents of a modified new UEFI image, in accordance with one embodiment;

FIG. 3D illustrates example contents of an updated UEFI image, in accordance with one embodiment.

DETAILED DESCRIPTION

The illustrative embodiments provide a method, an information handling system (IHS), and a computer program product for updating a unified extensible firmware interface (UEFI) image in a IHS.

In the following detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from the general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

Figure 1:
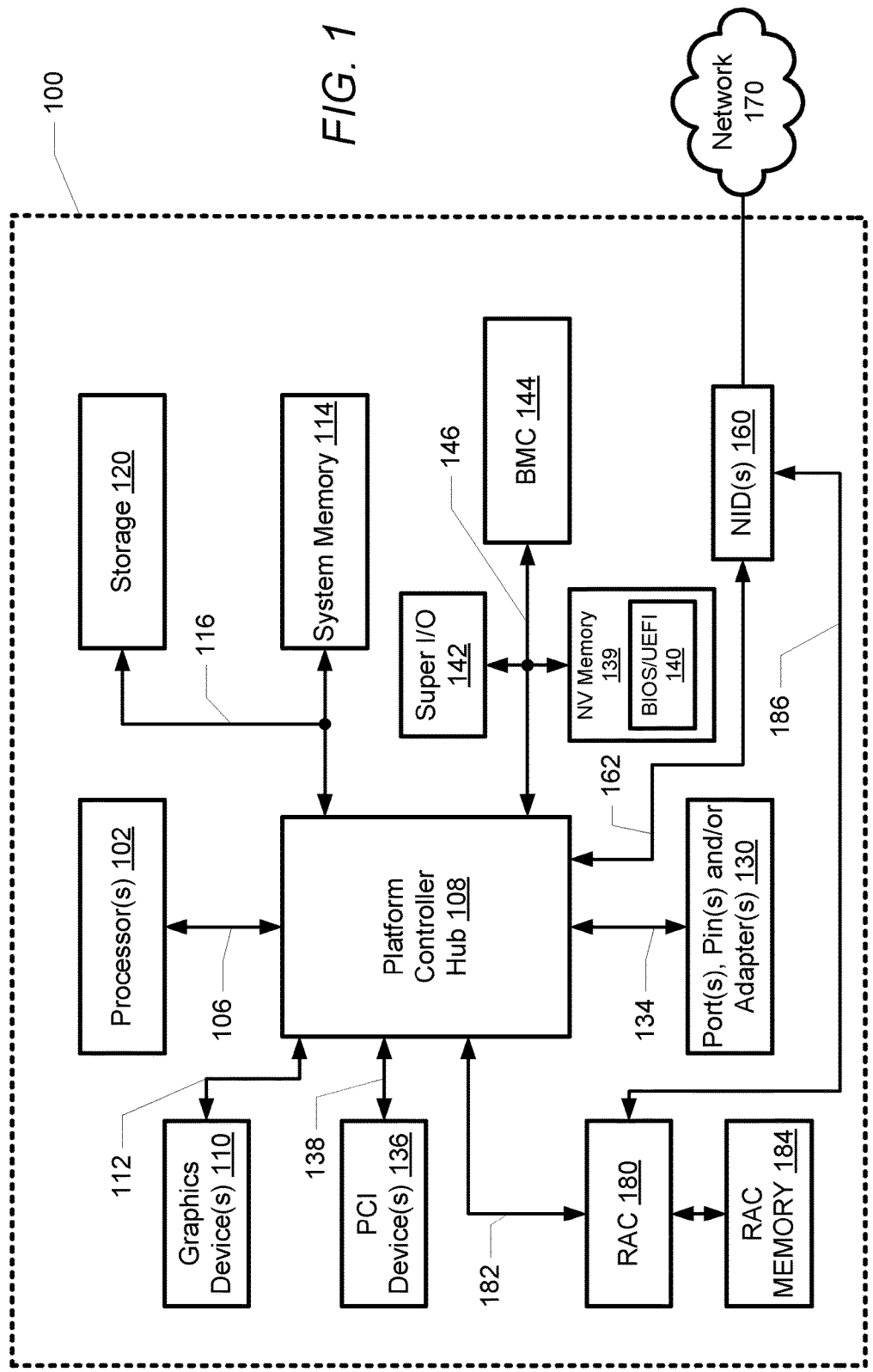
FIG. 1 illustrates one example of an IHS within which various aspects of the disclosure can be implemented, according to one or more embodiments.

FIG. 1 illustrates a block diagram representation of an example information handling system (IHS) 100, within which one or more of the described features of the various embodiments of the disclosure can be implemented. For purposes of this disclosure, an information handling system, such as IHS 100, may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a handheld device, personal computer, a server, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Referring specifically to FIG. 1, an example of an IHS 100 is shown. IHS 100 includes one or more processor(s) 102. In various embodiments, IHS 100 may be a single-processor system including one processor 102, or a multi-processor system including two or more processor(s) 102 (e.g., two, four, eight, or any other suitable number). Processor(s) 102 includes any processor capable of executing program instructions. In an embodiment, a motherboard is provided that is configured to provide structural support, power, and electrical connectivity between the various aforementioned components. Such a motherboard may include multiple connector sockets in various configurations, adapted to receive pluggable circuit cards, component chip packages, etc.

Processor(s) 102 are coupled to platform controller hub (PCH) or chipset 108 via front-side bus 106. PCH 108 may be configured to coordinate I/O traffic between processor(s) 102 and other components. For example, in this particular implementation, PCH 108 is coupled to graphics device(s) 110 (e.g., one or more video cards or adaptors, etc.) via graphics bus 112 (e.g., an Accelerated Graphics Port or AGP bus, a Peripheral Component Interconnect (PCI) bus, etc.). PCH 108 is also coupled to system memory 114 via memory bus 116. System memory 114 may be configured to store program instructions and/or data, accessible by processor(s) 102. In various embodiments, system memory 114 may be implemented using any suitable memory technology, such as static RAM (SRAM), synchronous dynamic RAM (SDRAM), nonvolatile/Flash-type memory, or any other type of memory.

Also coupled to memory bus 116 is storage device or storage 120 within which can be stored one or more software and/or firmware modules and/or data (not specifically shown). In one embodiment, storage 120 can be a hard drive or a solid state drive. The one or more software and/or firmware modules within storage 120 can be loaded into system memory 114 during operation of IHS 100.

PCH 108 is also coupled to one or more PCI devices 136 (e.g., modems, network cards, sound cards, video cards, shared memory etc.) via PCI bus 138. PCH 108 is further coupled to port(s), pin(s), and/or adapter(s) 130 over bus 134. Generally, PCH 108 may be configured to handle various I/O operations, and PCH 108 may provide interfaces such as, for instance, Universal Serial Bus (USB), audio, serial, parallel, Ethernet, and other interfaces, via port(s), pin(s), and/or adapter(s) 130 over bus 134. For example, PCH 108 may be configured to allow data to be exchanged between IHS 100 and other devices, such as other IHS s attached to a network. In various embodiments, PCH 108 may support communication via wired or wireless general data networks, such as any suitable type of Ethernet network, via telecommunications/telephony networks, such as analog voice networks or digital fiber communications networks, via storage area networks (SAN) such as Fiber Channel SANs, or via any other suitable type of network and/or protocol.

PCH 108 may also enable connection to one or more input devices, such as keyboards, keypads, touch screens, scanning devices, voice or optical recognition devices, or any other devices suitable for entering or retrieving data. Multiple I/O devices may be present in IHS 100. In some embodiments, I/O devices may be separate from IHS 100 and may interact with IHS 100 through a wired or wireless connection. PCH 108 is coupled to a non-volatile (NV) storage or memory device 139 via Low Pin Count (LPC) bus 146. NV memory 139 stores a basic input output system/unified extensible firmware interface (BIOS/UEFI) 140. PCH 108 is also coupled to super I/O Controller 142 and baseboard management controller (BMC) 144 via LPC bus 146.

BIOS/UEFI 140 includes program instructions stored thereon typically as BIOS or UEFI images. Those instructions may be usable by processor(s) 102 to initialize and test other hardware components and/or to load an Operating System (OS) onto IHS 100. As such, (BIOS/UEFI) 140 may include a firmware interface that allows processor(s) 102 to load and execute certain firmware, as described in more detail below. In some cases, such firmware may include program code that is compatible with the Unified Extensible Firmware Interface (UEFI) specification, although other types of firmware may be used.

IHS 100 further includes a board management controller (BMC) 144 that is in communication with NV memory 139 that can have program instructions stored thereon that are usable by processors(s) 102 to enable remote management of IHS 100. For example, BMC 144 may enable a user to discover, configure, and manage BMC 144, setup configuration options, resolve and administer hardware or software problems, etc. Additionally or alternatively, BMC 144 may include one or more BMC firmware volumes, each volume having one or more firmware files used by the UEFI firmware interface to initialize and test components of IHS 100. IHS 100 also includes a super I/O controller 142 that combines interfaces for a variety of lower bandwidth or low data rate devices. Those devices may include, for example, floppy disks, parallel ports, a keyboard and mouse and other devices.

In some cases, IHS 100 may be configured to access different types of computer-accessible media separate from system memory 114. Generally speaking, a computer-accessible memory device may include any tangible, non-transitory storage media or memory media such as electronic, magnetic, or optical media (e.g., magnetic disk, a hard drive, a CD/DVD-ROM, a Flash memory, etc.) coupled to IHS 100 via PCH 108. Where utilized herein, the terms "tangible" and "non-transitory" are intended to describe a computer-readable storage medium (or "memory") excluding propagating electromagnetic signals; but are not intended to otherwise limit the type of physical computer-readable storage device that is encompassed by the phrase "computer-readable medium" or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link. IHS 100 further includes one or more network interface devices (NID(s)) 160 coupled to PCH 108 via PCI bus 162. NID(s) 160 enables IHS 100 to communicate and/or interface with other devices, services, and components that are located external to IHS 100. These devices, services, and components can interface with IHS 100 via an external network, such as example network 170, using one or more communication protocols. In one embodiment, a customer provisioned system/platform can comprise multiple devices located across a distributed network, and NID 160 enables IHS 100 to be connected to these other devices. Network 170 can be a local area network, wide area network, personal area network, and the like, and the connection to and/or between network 170 and IHS 100 can be wired or wireless or a combination thereof. For purposes of discussion, network 170 is indicated as a single collective component for simplicity. However, it is appreciated that network 170 can comprise one or more direct connections to other devices as well as a more complex set of interconnections as can exist within a wide area network, such as the Internet.

IHS 100 further includes a remote access controller (RAC) 180 coupled via a PCI bus 182 to PCH 108. RAC 180 provides management functions that allow an administrator to deploy, monitor, manage, configure, update, troubleshoot and remediate IHS 100. RAC 180 is also coupled to RAC memory 184. In one embodiment, RAC memory 184 can be shared with processor(s) 102. RAC 180 is also communicatively coupled to NID(s) 160 via a sideband bus 186.

RAC 180 monitors and controls the operation of IHS 100 and other systems and devices communicatively coupled to IHS 100. RAC 180 can also perform configuration and remote control of other connected IHSs. Certain software and/or firmware modules stored in RAC memory 184 can be executed by RAC 180. Processor(s) 102 and RAC 180 include specific firmware that enables processor(s) 102 and RAC 180 to perform the various functions described herein.

A person of ordinary skill in the art will appreciate that IHS 100 is merely illustrative and is not intended to limit the scope of the disclosure described herein. In particular, any computer system and/or device may include any combination of hardware or software capable of performing certain operations described herein. For instance, although IHS 100 is illustrated following a first type architecture, various systems and methods described herein may be adapted to work with any other architecture having a different chipset and/or RAC configuration. In addition, the operations performed by the illustrated components may, in some embodiments, be performed by fewer components or distributed across additional components. Similarly, in other embodiments, the operations of some of the illustrated components may not be performed and/or other additional operations may be available.

In other implementations, one or more of the devices or components shown in FIG. 1 may be absent, or one or more other components may be added. Accordingly, systems and methods described herein may be implemented or executed with other computer system configurations.

With reference now to FIG. 2A, one embodiment of example contents of system memory 114 of IHS 100 is shown. System memory 114 includes data, software, and/or firmware modules, including application(s) 202, and operating system (O/S) 204, new UEFI image 206 and modified new UEFI image 210. System memory 114 can also include other data, software, and/or firmware modules. New UEFI image 206 includes meta-data 208 and modified new UEFI image 210 includes meta-data 212. Meta-data 208 and meta-data 212 contain information and data about the contents of the UEFI images such as data types, memory region names, sizes and addresses. In one embodiment, new UEFI image 206 can be received via port(s), pin(s), and/or adapter(s) 130 over bus 134. In another embodiment, new UEFI image 206 can be received via RAC 180. In one embodiment, the modified new UEFI image 210 contains data type regions that are increased in size sufficient to store data contained in the new UEFI image 206.

Turning to FIG. 2B, one embodiment of example contents of NV memory 139 of IHS 100 is shown. NV memory 139 includes BIOS/UEFI 140 and separate firmware 260 that enables booting of IHS 100 and updating UEFI images. BIOS/UEFI 140 can include (i) a current UEFI image 230 that can be loaded during system start-up by IHS 100 and (ii) an updated UEFI image 234. Current UEFI image 230 includes meta-data 232, and updated UEFI image 234 includes meta-data 236. Meta-data 232 and meta-data 236 contain information and data about the contents of the respective UEFI images, such as data types, memory region names, sizes and addresses.

Firmware 260 contains a boot manager or UEFI loader 262, an OS loader module 264, and a BIOS/UEFI update manager 266. Firmware 260 is a software and/or firmware module that executes on processor 102 of IHS 100 (i.e., when booting or updating UEFI images). Boot manager 262 operates during the device execution phase (DXE) of booting and facilitates the loading of current UEFI images 230. OS loader 264 operates during the transient system load phase of booting and facilitates the loading of OS 204. BIOS/UEFI update manager 266 operates when the current UEFI image 230 is updated with a new UEFI image 206. BIOS/UEFI update manager 266 performs the processes 402 to 434 presented in the flowchart of FIGS. 4A-B.

FIG. 3A illustrates further details of current UEFI image 230 stored in NV memory 139. Current UEFI image 230 can contain code type regions and data type regions. Each of the code type regions can have an associated name, size, and address range in memory. Each of the data type regions can have an associated name, size, and address range in memory. At least some of the values for the types, names, size, and address range can be stored in meta-data 232 (FIG. 2B). Current UEFI image 230 contains data type region names D1 322, D2 326, D3 328, D4 330, and D5 332. In current UEFI image 230, the data type regions 322-332 are typically marked as being non-writeable regions so that they are not erased. Current UEFI image 230 also contains code type region names C1 old 324 and C2 old 336. Current UEFI image 230 further contains unused memory space 334.

FIG. 3B illustrates further details of new UEFI image 206 stored in system memory 114. New UEFI image 206 can contain code type regions C1 new 342 and C2 new 344 and data type regions D3 346. The data type regions (i.e. D3 346) of new UEFI image 206 do not contain useful data and are not written to NV memory 139. The data regions of new UEFI image 206 are filled with the erase value of NV memory 139. Each of the code type regions can have an associated name, size, and address range in memory. Each of the data type regions can have an associated name, size, and address range in memory. At least some of the values for the types, names, size, and address ranges can be stored in meta-data 208 (FIG. 2A). New UEFI image 206 contains meta-data 208 that describes data type region D3 346 as being larger in size than D3 328. However, data type region D3 346 does not contain useful data and is filled with the erase value of NV memory 139. New UEFI image 206 contains new code in code type region C1 new 342 and C2 new 344.

FIG. 3C illustrates further details of modified new UEFI image 210 stored in system memory 114. Modified UEFI image 210 can contain code type regions C1 new 252 and C2 new 354 and data type regions D3' 356, D4 358, and D5 360. Each of the code type regions can have an associated name, size and address range in memory. Each of the data type regions can have an associated name, size and address range in memory. At least some of the values for the types, names, size, and address range can be stored in meta-data 212 (FIG. 2A). Modified new UEFI image 210 contains code in code type region C1 new 352 and C2 new 354. Code type regions C1 new 352 and C2 new 354 contain the same code as copied from new UEFI image 206 (i.e. C1 new 342 and C2 new 344. Modified new UEFI image 210 contains an enlarged data type region, D3' 356 that is larger in size than D3 328 of FIG. 3A. The enlarged portion of D3' 356 is filled with the NV memory erase value (i.e. D3' erase 357). Modified new UEFI image 210 further contains data code type region D4 358 and D5 360 that have been moved to new starting addresses in memory due to the increased size of data type region D3' 356. Modified new UEFI image 210 also contains unused memory space 362 that is smaller than unused memory space 334 of FIG. 3A because of the extra memory space taken up by the enlarged data code type region D3' 356.

BIOS/UEFI update manager 266, executing on processor 102, compares the sizes and starting addresses of the data type regions between current UEFI image 230 and new UEFI image 206. If the sizes of the data type regions contained in new UEFI image 206 are larger than or equal to the corresponding sizes of the current UEFI image 230, or the starting addresses are different, the data associated with the specific data type regions of the new UEFI image 206 are copied to the modified new UEFI image 210. During the copying process, any memory regions requiring additional memory space are re-sized (increased) and/or moved to a new starting addresses, if required. Meta-data 208 and 232 contain the names, starting addresses, sizes, and types (code or data) of each region. When a UEFI image is modified in some particular way, the code or data region sizes and/or locations of the UEFI image may need to be modified. In a UEFI environment meta-data 208 and 232 include a forms data format (FDF) file that tells the compilers and tools where each region is located in the UEFI image within NV memory 139.

FIG. 3D illustrates further details of updated UEFI image 234 stored in NV memory 139. Updated UEFI image 234 can contain code type regions and data type regions. Each of the code type regions can have an associated name, size, and address range in memory. Each of the data type regions can have an associated name, size, and address range in memory. At least some of the values for the types, names, size and address range can be stored in meta-data 236 (FIG. 2B). Updated UEFI image 234 contains a combination of code and data type regions from current UEFI image 230 that have not been changed or enlarged and the code and data type regions from modified new UEFI image 210. Updated UEFI image 234 contains data type regions D1 322, D2 326, D3" 378, D4 380, and D5 382. Updated UEFI image 234 also contains code type regions C1 new 372, C2 new 374 and unused memory space 384. During writing of updated UEFI image 234 to NV memory 139, BIOS/UEFI update manager 266, executing on processor 102, combines the code and data type regions from current UEFI image 230 that have not been enlarged with the code and data type regions from modified new UEFI image 210 (i.e., the data regions that have been enlarged). Within updated UEFI image 234, the data regions that have not been enlarged or moved (i.e., D1 322 and D2 326) are not marked as writable and stay the same as in current UEFI image 230.

Figure 4A:
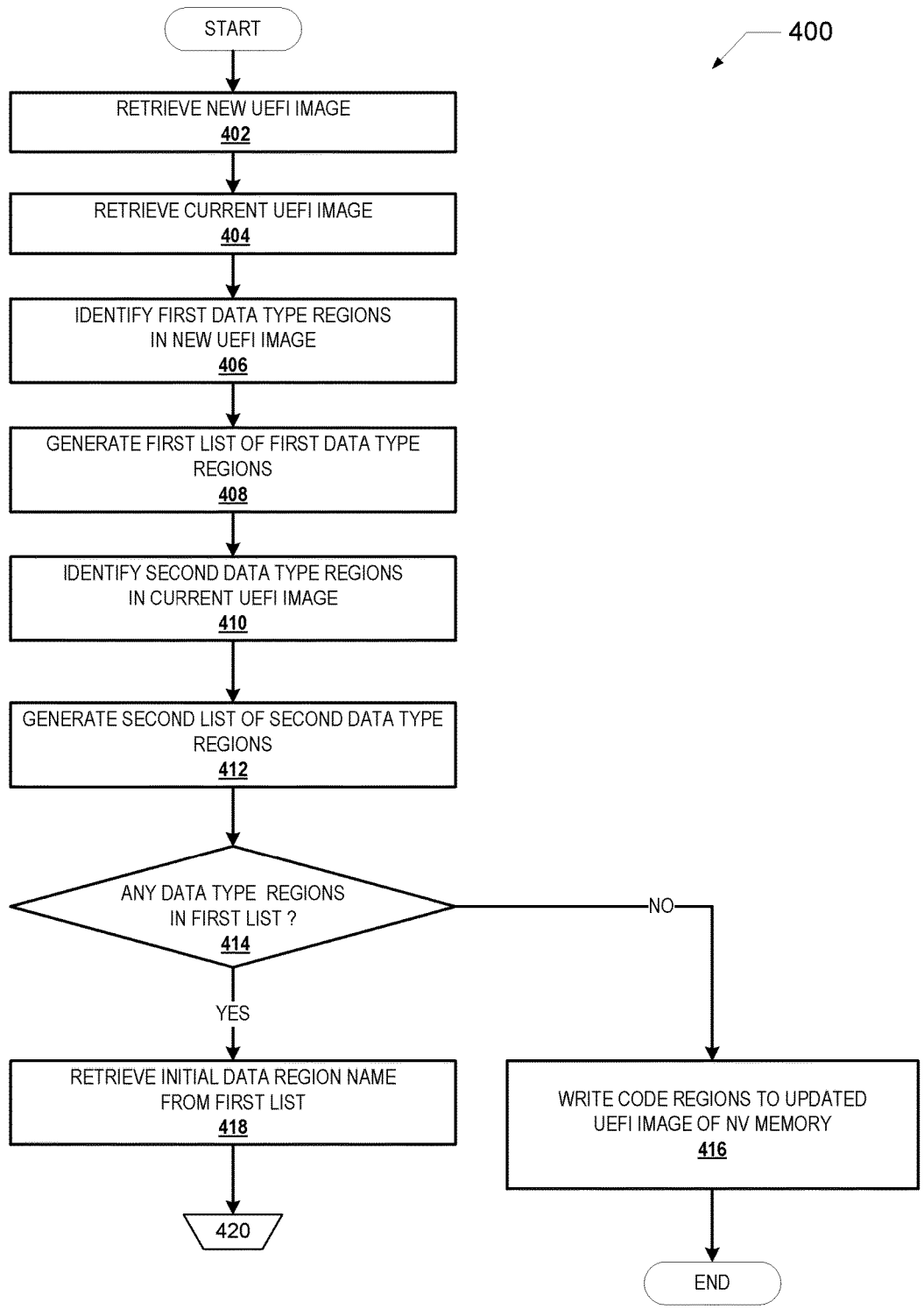
FIGS. 4A-B are a flow chart illustrating one example of a method of updating a UEFI image in an IHS, in accordance with one embodiment.
Figure 4B:
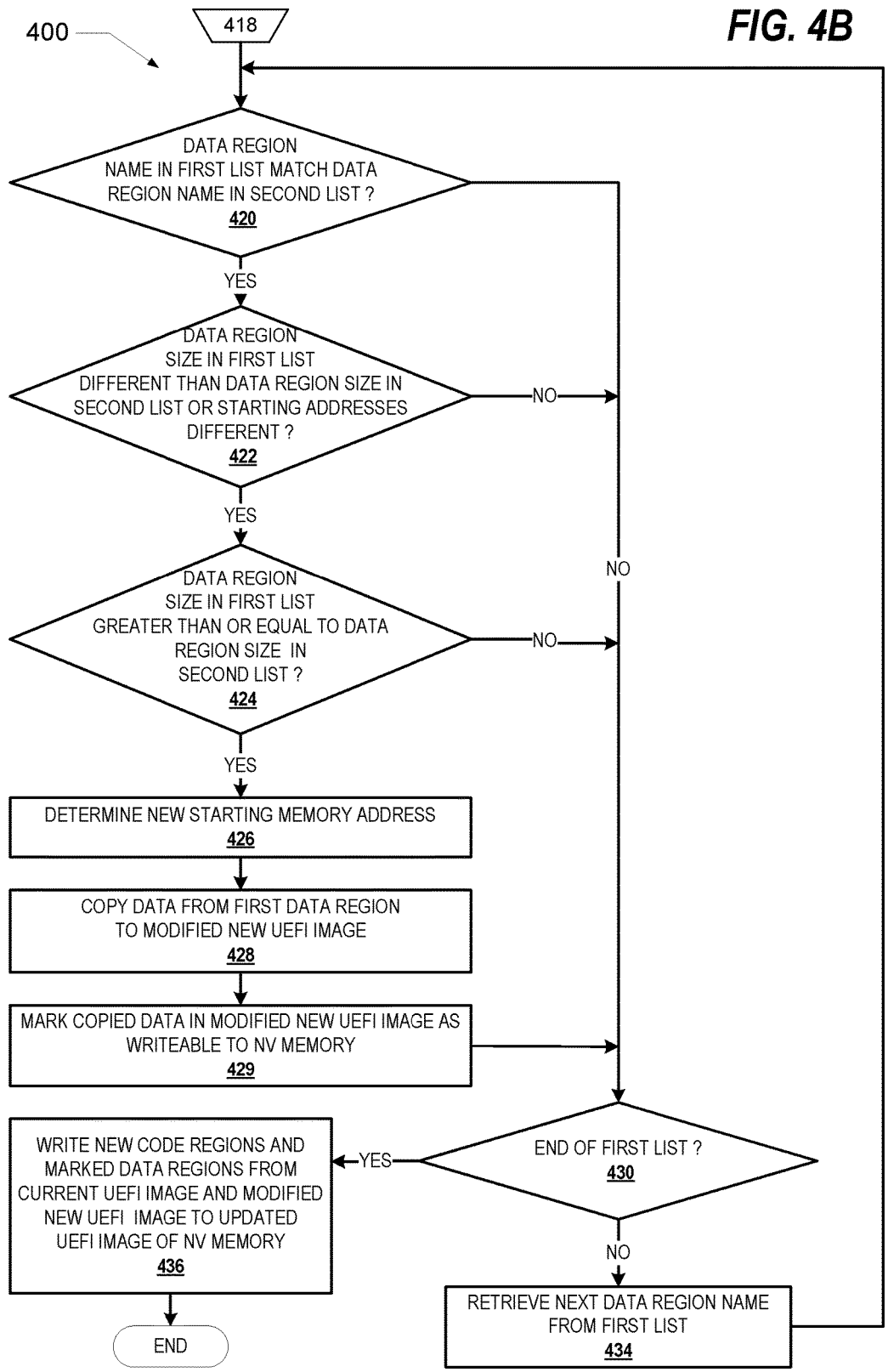

FIGS. 4A and 4B illustrate a flowchart of an exemplary method 400 by which processor 102 within the preceding figures performs different aspects of the processes that enable the one or more embodiments of the disclosure. Generally, method 400 represents a computer-implemented method for updating a UEFI image in an IHS. The description of method 400 is provided with general reference to the specific components illustrated within the preceding FIGS. 1-3D. Generally, method 400 is described as being implemented via processor 102 and particularly the execution of code provided by firmware 260 and specifically by the firmware of BIOS/UEFI update manager 266 acting within processor 102. It is however appreciated that certain aspects of the described methods may be implemented via other processing devices and/or execution of other code.

Referring to the flow chart of FIG. 4A, method 400 begins at the start block and proceeds to block 402 where processor 102 retrieves new UEFI image 206 from system memory 114. Processor 102 also retrieves current UEFI image 230 from NV memory 139 (block 404). Processor 102 identifies data type regions in new UEFI image 206 (first data type regions, e.g., D3 346) (block 406) and generates a first list of the first data type regions (block 408). In an example embodiment, the first list can contain data type region D3 346. The first data type regions can be at least partially identified through the use of meta-data 208. Processor 102 identifies data type regions in current UEFI image 230 (second data type regions, e.g., D1 322-D5 332) (block 410) and generates a second list of the second data type regions (block 412). In an example embodiment, the second first list can contain data type regions D1 322-D5 332. The second data type regions can be at least partially identified through the use of meta-data 232.

Processor 102 determines if there are any data type regions on the first list (decision block 414). In response to determining that there are no data type regions on the first list, processor 102 writes the new code regions from new UEFI image 206 to updated UEFI image 234 (block 416). Any unmarked data regions from the current UEFI image 230 remain the same. Method 400 then ends. In response to determining that there are data type regions on the first list, (i.e. D3 346), processor 102 retrieves an initial data type region name (i.e. D3 346) from the first list (block 418).

Turning to FIG. 4B, processor 102 determines if the initial data type region name on the first list matches a data type region name on the second list (decision block 420). In response to determining that the initial data type region name on the first list does not match a data type region name on the second list, processor 102 determines if the end of the first list has been reached (decision block 430). In response to determining that the end of the first list has been not reached, processor 102 retrieves the next data type region name from the first list (block 434) and returns to block 420 to determine if the next data type region name on the first list matches a data type region name on the second list In response to determining that the initial data type region name on the first list (i.e. D3 346), does match a data type region name on the second list (i.e. D3 328), processor 102 determines if a first size of the first data type region is different than a second size of the second data type region, or if the starting memory address of the first data type region is different than the starting memory address of the second data type region (decision block 422). In response to the first size not being different than the second size or the starting memory address of the first data type region not being different than the starting memory address of the second data type region, processor 102 continues to decision block 430 where, processor 102 determines if the end of the first list has been reached.

In response to the first size of the first data type region (i.e. D3 346), being different than the second size of the second data type region (i.e. D3 328), or the starting memory address of the first data type region (i.e. D3 346), being different than the starting memory address of the second data type region (i.e. D3 328), processor 102 determines if the first size is greater than or equal to the second size (decision block 424). In response to the first size not being greater than or equal to the second size, processor 102 continues to decision block 430 where, processor 102 determines if the end of the first list has been reached.

In response to the first size being greater than or equal to the second size, processor 102 determines a new starting memory address for the first data type region (block 426) and copies data associated with the first data type region from current UEFI image 230 (i.e. D3 328) to modified new UEFI image 210 (i.e. D3' 356) (block 428). The remaining portion of D3' 356 is filled with the NV memory erase value (i.e. D3' erase 357). If a data region is required to be moved (i.e., requires a new starting address), even if the size is the same, the data region in current UEFI image 230 is copied to its new location in updated UEFI image 234. Processor 102 marks the data copied (i.e. the data in D3' 356) to the modified new UEFI image 206 as writable by NV memory 139 (block 429). Processor 102 then returns to block decision block 430 to determine if the end of the first list has been reached.

In response to determining that the end of the first list has been reached in decision block 430, processor 102 writes the new code regions and marked data regions from modified new UEFI image 208 (i.e. C1 new 352, D3' 356, D4 358, D5 360 and C2 new 354) to the updated UEFI image 234 (block 436). Method 400 then ends. If D1 322 and D2 326 are not marked as writeable regions, they stay the same within the updated UEFI image 234 as in the current UEFI image 230.

Method 400 allows for one or more data type regions to have a larger size in a new UEFI image than in the current UEFI image. In other words, method 400 can re-size a data type region in the UEFI image that is to be written to a NV memory device. The data type region size is increased in the modified new UEFI image sufficient to store the data associated with the data type region. Method 400 further allows for the starting addresses of one or more data type regions to be moved or shifted in order to accommodate a larger size data type region in a new UEFI image. According to one aspect, method 400 provides for copying data in bulk without regard for the type of data. Method 400 can be applied to any type of data and is a fast method of updating data.

In the above described flow chart, one or more of the methods may be embodied in a computer readable medium containing computer readable code such that a series of functional processes are performed when the computer readable code is executed on a computing device. In some implementations, certain steps of the methods are combined, performed simultaneously or in a different order, or perhaps omitted, without deviating from the scope of the disclosure. Thus, while the method blocks are described and illustrated in a particular sequence, use of a specific sequence of functional processes represented by the blocks is not meant to imply any limitations on the disclosure. Changes may be made with regards to the sequence of processes without departing from the scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object oriented programming language, without limitation. These computer program instructions may be provided to a processor of a general purpose computer, special purpose computer, such as a service processor, or other programmable data processing apparatus to produce a machine, such that the instructions, which execute via the processor of the computer or other programmable data processing apparatus, performs the method for implementing the functions/acts specified in the flowchart and/or block diagram block or blocks.

One or more of the embodiments of the disclosure described can be implementable, at least in part, using a software-controlled programmable processing device, such as a microprocessor, digital signal processor or other processing device, data processing apparatus or system. Thus, it is appreciated that a computer program for configuring a programmable device, apparatus or system to implement the foregoing described methods is envisaged as an aspect of the present disclosure. The computer program may be embodied as source code or undergo compilation for implementation on a processing device, apparatus, or system. Suitably, the computer program is stored on a carrier device in machine or device readable form, for example in solid-state memory, magnetic memory such as disk or tape, optically or magneto-optically readable memory such as compact disk or digital versatile disk, flash memory, etc. The processing device, apparatus or system utilizes the program or a part thereof to configure the processing device, apparatus, or system for operation.

As will be further appreciated, the processes in embodiments of the present disclosure may be implemented using any combination of software, firmware or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A computer implemented method for updating a unified extensible firmware interface (UEFI) image in an information handling system (IHS), the method comprising:
retrieving, via a processor, a new UEFI image from a system memory device;
retrieving a current UEFI image from a non-volatile storage device;
identifying a plurality of first data type regions contained within the new UEFI image;
identifying a plurality of second data type regions contained within the current UEFI image;
determining if a first data type region name from the new UEFI image matches a second data type region name from the current UEFI image;
in response to determining that the first data type region name from the new UEFI image matches the second data type region name from the current UEFI image, determining if a first size associated with the first data type region is larger than or equal to a second size associated with the second data type region; and
in response to determining that the first size is larger than or equal to the second size, copying data associated with the first data type region name to a modified new UEFI image, wherein during the copying, in response to the first size being larger than the second size, a corresponding first size of a corresponding first data type region within the modified new UEFI image is increased to the larger first size, sufficient to store the data associated with the first data type region name;
marking the data copied to the modified new UEFI image as writable by non-volatile (NV) memory;
writing code regions and marked data regions from the modified new UEFI image to an updated UEFI image;
combining, within the updated UEFI image, the code regions and data type regions from the current UEFI image that have not been enlarged or moved to new starting addresses with the code regions and data type regions from the modified new UEFI image;
wherein, within the updated UEFI image, the data regions that have not been enlarged or moved are not marked as writable and stay the same as in the current UEFI image, and the data regions from the modified new image are marked as writable; and
writing the updated UEFI image to the NV memory.

2. The method of claim 1, further comprising:
determining if a first starting address of the first data type region is different than a second starting address of the second data type region; and
in response to the first data type region requiring a new starting address, copying the second data type region in the current UEFI image to a new location identified by the new starting address in an updated UEFI image.

3. The method of claim 1, wherein to increase the corresponding first size of the corresponding first data type region within the modified new UEFI image to the larger first size, the method further comprises:
incorporating an enlarged portion of the first data type region within the modified new UEFI image, the enlarge portion comprising NV memory erase value;
in response to a third data type region immediately following the second data type region within the current UEFI image, determining a new starting address for a corresponding third data type region within the modified new UEFI image; and
in response to a region of unused space immediately following the second data type region within the current UEFI image, extending the enlarged portion into at least a portion of the unused space sufficient to accommodate the enlarged portion.

4. The method of claim 1, further comprising:
determining if a third data type region name from the new UEFI image matches a fourth data type region name from the current UEFI image;
in response to determining that the third data type region name from the new UEFI image matches the fourth data type region name from the current UEFI image, determining if a third size of the third data type region is larger than or equal to a fourth size of the fourth data type region;
in response to determining that the third size of the third data type region is larger than or equal to a fourth size of the fourth data type region, determining a new starting address for the third data type region; and
copying data associated with the third data type region to the modified new UEFI image, wherein the third data type region is moved to a new starting address in the modified new UEFI image.

5. The method of claim 1, further comprising:
marking the data copied from the first data type region to the modified new UEFI image as writable by the non-volatile storage device.

6. The method of claim 1, further comprising:
generating a first list of the first data type regions contained within the new UEFI image;
generating a second list of the second data type regions contained within the current UEFI image;
determining if the new UEFI image contains any new data type regions; and
in response to determining that the new UEFI image does contain at least one new data type region, retrieving an initial data type region name from the first list.

7. The method of claim 6, further comprising:
sequentially searching the first list;
determining if an end of the first list of first data type regions has been reached; and
in response to determining that the end of the first list of first data type regions has not been reached, retrieving the next data type region name from the first list.

8. An information handling system (IHS) comprising:
a system memory device storing a new unified extensible firmware interface (UEFI) image;
a non-volatile storage device having a current UEFI image stored thereon;
a processor communicatively coupled to the system memory device and the non-volatile storage device, the processor having firmware executing thereon to enable updating of the current UEFI image, wherein the firmware configures the processor to:
retrieve, a new UEFI image from the system memory device;
retrieve a current UEFI image from the non-volatile storage device;
identify a plurality of first data type regions contained within the new UEFI image;
identify a plurality of second data type regions contained within the current UEFI image;
determine if a first data type region name from the new UEFI image matches a second data type region name from the current UEFI image;
in response to determining that the first data type region name from the new UEFI image matches the second data type region name from the current UEFI image, determine if a first size associated with the first data type region is larger than or equal to a second size associated with the second data type region;

in response to determining that the first size is larger than or equal to the second size, copy data associated with the first data type region name to a modified new UEFI image, wherein during the copying, in response to the first size being larger than the second size, a corresponding first size of a corresponding first data type region within the modified new UEFI image is increased to the larger first size, sufficient to store the data associated with the first data type region;

mark the data copied to the modified new UEFI image as writable by non-volatile (NV) memory;

write code regions and marked data regions from the modified new UEFI image to an updated UEFI image;

combine, within the updated UEFI image, the code regions and data type regions from the current UEFI image that have not been enlarged with the code regions and data type regions from the modified new UEFI image;

wherein, within the updated UEFI image, the data regions that have not been enlarged or moved are not marked as writable and stay the same as in the current UEFI image, and the data regions from the modified new image are marked as writable; and write the updated UEFI image to the NV memory.

9. The information handling system of claim 8, wherein the firmware further configures the processor to:

determine if a first starting address of the first data type region is different than a second starting address of the second data type region; and in response to the first data type region requiring a new starting address, copy the second data type region in the current UEFI image to a new location identified by the new starting address in an updated UEFI image.

10. The information handling system of claim 8, wherein to increase the corresponding first size of the corresponding first data type region within the modified new UEFI image to the larger first size, the firmware further configures the processor to:

incorporate an enlarged portion of the first data type region within the modified new UEFI image, the enlarge portion comprising NV memory erase value;

in response to a third data type region immediately following the second data type region within the current UEFI image, determine a new starting address for a corresponding third data type region within the modified new UEFI image; and in response to a region of unused space immediately following the second data type region within the current UEFI image, extend the enlarged portion into at least a portion of the unused space sufficient to accommodate the enlarged portion.

11. The information handling system of claim 8, wherein the firmware further configures the processor to:

determine if a third data type region name from the new UEFI image matches a fourth data type region name from the current UEFI image;

in response to determining that the third data type region name from the new UEFI image matches the fourth data type region name from the current UEFI image, determine if a third size of the third data type region is larger than or equal to a fourth size of the fourth data type region;

in response to determining that the third size of the third data type region is larger than or equal to a fourth size of the fourth data type region, determine a new starting address for the third data type region; and copy data associated with the third data type region to the modified new UEFI image, wherein the third data type region is moved to a new starting address in the modified new UEFI image.

12. The information handling system of claim 8, wherein the firmware further configures the processor to:

mark the data copied from the first data type region to the modified new UEFI image as writable by the non-volatile storage device.

13. The information handling system of claim 8, wherein the firmware further configures the processor to:

generate a first list of the first data type regions contained within the new UEFI image;

generate a second list of the second data type regions contained within the current UEFI image;

determine if the new UEFI image contains any new data type regions; and in response to determining that the new UEFI image does contain at least one new data type region, retrieve an initial data type region name from the first list.

14. The information handling system of claim 13, wherein the firmware further configures the processor to:

sequentially search the first list;

determine if an end of the first list of first data type regions has been reached; and in response to determining that the end of the first list of first data type regions has not been reached, retrieve the next data type region name from the first list.

15. A computer program product comprising: a computer readable storage device; and program code stored on the computer readable storage device that, when executed by a processor, configures the processor to:

retrieve, a new UEFI image from a system memory device;

retrieve a current UEFI image from a non-volatile storage device;

identify a plurality of first data type regions contained within the new UEFI image;

identify a plurality of second data type regions contained within the current UEFI image;

determine if a first data type region name from the new UEFI image matches a second data type region name from the current UEFI image;

in response to determining that the first data type region name from the new UEFI image matches the second data type region name from the current UEFI image, determine if a first size associated with the first data type region is larger than or equal to a second size associated with the second data type region;

in response to determining that the first size is larger than or equal to the second size, copy data associated with the first data type region to a modified new UEFI image, wherein the first data type region size is increased in the modified new UEFI image sufficient to store the data associated with the first data type region;

in response to determining that the first size is larger than or equal to the second size, copy data associated with the first data type region name to a modified new UEFI image, wherein during the copying, in response to the first size being larger than the second size, a corresponding first size of a corresponding first data type region within the modified new UEFI image is increased to the larger first size, sufficient to store the data associated with the first data type region;

mark the data copied to the modified new UEFI image as writable by non-volatile (NV) memory;

write code regions and marked data regions from the modified new UEFI image to an updated UEFI image;

combine, within the updated UEFI image, the code regions and data type regions from the current UEFI image that have not been enlarged with the code regions and data type regions from the modified new UEFI image;

wherein, within the updated UEFI image, the data regions that have not been enlarged or moved are not marked as writable and stay the same as in the current UEFI image, and the data regions from the modified new image are marked as writable; and write the updated UEFI image to the NV memory.

16. The computer program product of claim 15, wherein the code, when executed by the processor, further configures the processor to:

determine if a first starting address of the first data type region is different than a second starting address of the second data type region; and in response to the first data type region requiring a new starting address, copying the second data type region in the current UEFI image to a new location identified by the new starting address in an updated UEFI image.

17. The computer program product of claim 15, wherein, to increase the corresponding first size of the corresponding first data type region within the modified new UEFI image to the larger first size, the code further configures the processor to:

incorporate an enlarged portion of the first data type region within the modified new UEFI image, the enlarge portion comprising NV memory erase value;

in response to a third data type region immediately following the second data type region within the current UEFI image, determine a new starting address for a corresponding third data type region within the modified new UEFI image; and in response to a region of unused space immediately following the second data type region within the current UEFI image, extend the enlarged portion into at least a portion of the unused space sufficient to accommodate the enlarged portion.

18. The computer program product of claim 15, wherein the code, when executed by the processor, further configures the processor to:

determine if a third data type region name from the new UEFI image matches a fourth data type region name from the current UEFI image;

in response to determining that the third data type region name from the new UEFI image matches the fourth data type region name from the current UEFI image, determine if a third size of the third data type region is larger than or equal to a fourth size of the fourth data type region;

in response to determining that the third size of the third data type region is larger than or equal to a fourth size of the fourth data type region, determine a new starting address for the third data type region; and copy data associated with the third data type region to the modified new UEFI image, wherein the third data type region is moved to a new starting address in the modified new UEFI image.

* * * * *